United States Patent
Lee

[15] 3,663,091
[45] May 16, 1972

[54] ACOUSTIC RESONANCE DAMPING APPARATUS
[72] Inventor: Tzou-Chang Lee, Minneapolis, Minn.
[73] Assignee: Honeywell Inc., Minneapolis, Minn.
[22] Filed: Dec. 17, 1969
[21] Appl. No.: 885,795

[52] U.S. Cl. .............................................. 350/160, 350/150
[51] Int. Cl. ............................................................... G02f 1/20
[58] Field of Search .......................... 350/149, 150, 160, 161; 310/8.2

[56] References Cited

UNITED STATES PATENTS

| | | | |
|---|---|---|---|
| 3,365,581 | 1/1968 | Tell et al. | 350/150 |
| 3,403,271 | 9/1968 | Lobdell et al. | 310/8.2 |
| 3,454,325 | 7/1969 | Ohm | 350/160 |
| 3,492,596 | 1/1970 | Vorie | 350/149 |
| 3,506,928 | 4/1970 | Korpel | 350/161 |
| 3,509,489 | 4/1970 | Burns et al. | 350/161 |
| 3,524,145 | 8/1970 | Fowler | 331/94.5 |

OTHER PUBLICATIONS

Stephany, " Piezo-Optic Resonance in Crystals of Dihydrogen Phosphate Type," JOSA, Vol. 55, 02, 2/65 pp. 136–142

*Primary Examiner*—Ronald L. Wibert
*Assistant Examiner*—Jeff Rothenberg
*Attorney*—Lamont B. Koontz and Robert O. Vidas

[57] ABSTRACT

Apparatus is disclosed which utilizes an acoustic impedance matching technique to substantially reduce the occurrence of acoustic resonances in an electro-optic crystal. In one embodiment, the acoustic resonance damping apparatus is adapted to apply an electric field to the electro-optic crystal. Several additional embodiments are disclosed.

4 Claims, 6 Drawing Figures

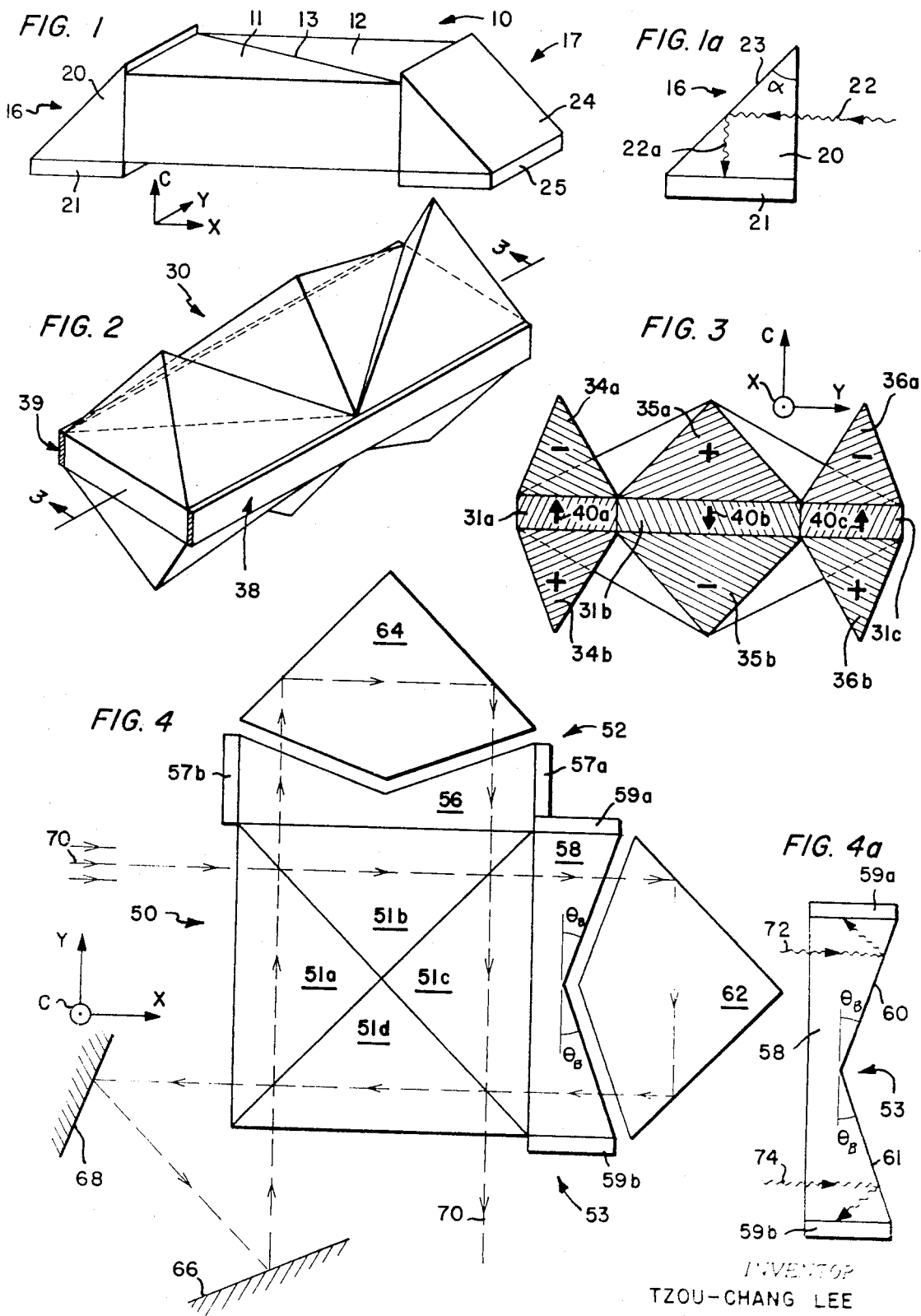

ACOUSTIC RESONANCE DAMPING APPARATUS

BACKGROUND OF THE INVENTION

The present invention relates to an electro-optic light beam modulator and particularly to apparatus for preventing the occurrence of acoustic resonances therein.

The electro-optic (E-O) effect exhibited by such crystals as potassium dyhydrogen phosphate (KDP) and lithium niobate (LiNbO₃) has been advantageously utilized to selectively modulate a light beam. This utilization has increased greatly since the advent of the laser. However, the electro-optic effect is inherently accompanied by a piezoelectric effect which is detrimental to the performance of an E-O crystal in the following manner. First, the mechanical strain induced by the piezoelectric effect causes a change in the physical dimensions of the crystal resulting in additional modulation of an incident light beam. Secondly, the piezoelectric effect gives rise to a photoelastic effect which results in a change in the crystal's refractive index. This effect is commonly referred to as the indirect E-O effect. At certain frequencies of the modulating field applied to the E-O crystal, the crystal undergoes mechanical or acoustical resonance. At these frequencies the two above-mentioned effects are particularly strong. As a result, broad band light beam modulation is not obtainable unless the piezoelectrically induced acoustic vibrations are dampened.

The prior art has attempted to suppress the piezoelectrically induced acoustic vibrations by mechanically clamping the electro-optic element. The mechanical clamping dampens the low frequency acoustic vibrations. In some cases, the apparatus, including the E-O element, is then immersed in a viscous fluid which dampens out the higher frequency acoustic resonances. For a fuller description of such a damping technique see U.S. Pat. No. 3,454,325 to E. A. Ohm entitled "Optical Wave Modulator With Suppressed Piezoelectric Resonances."

The prior art damping technique described above necessitates considerably more complex apparatus than the present invention.

SUMMARY OF THE INVENTION

The present invention utilizes an acoustic vibration damping means positioned contiguous to at least one face of a light-modulating, E-O crystal. The acoustic vibration damping means has substantially the same acoustic impedance as he E-O crystal so that the piezoelectrically induced acoustic vibrations incident the interface between the E-O crystal and damping means are transmitted into the damping means.

Utilizing the present invention, internal reflection of the acoustic energy at interface of the crystal and the surrounding medium is prevented. The acoustic energy transmitted out of the E-O crystal is dampened or directed such that it does not return to the crystal. As a result, acoustic resonances within the crystal do not occur. Thus, broad-band electro-optic modulation is achieved utilizing relatively simple apparatus in comparison with the prior art.

BRIEF DESCRIPTION OF THE DRAWING

FIG. 1 illustrates one embodiment of the present invention having means for damping acoustic vibrations occurring along one dimension within an E-O light beam modulator.

FIG. 1a is a cross-sectional view of the acoustic vibration damping means illustrated in FIG. 1.

FIG. 2 illustrates another embodiment of the present invention wherein the acoustic vibration damping means are adapted to apply an electric field to the E-O light beam modulator.

FIG. 3 is a cross-sectional view of the apparatus shown in FIG. 2.

FIG. 4 is a further embodiment of the present invention wherein the acoustic vibration damping means dampens the acoustic vibrations occurring along two dimensions within the E-O light beam modulator.

FIG. 4a is a cross-sectional view of the acoustic vibration damping means illustrated in FIG. 4.

DETAILED DESCRIPTION OF THE PREFERRED EMBODIMENTS

The light beam modulator illustrated in FIG. 1 comprises a composite electro-optic (E-O) crystal, generally designated 10, and acoustic vibrations damping means, generally designated 16 and 17. For purposes of this specification, the term light beam modulator includes electro-optic elements which provide either light beam deflection or light beam modulation such as is achieved by rotating the polarization vector of an incident light beam. Furthermore, the phrase "acoustic resonance damping" refers to a substantial reduction in the amplitude of the resonance and a lowering of the resonance frequency.

As illustrated in FIG. 1, electro-optic crystal 10 is composed of E-O crystals 11 and 12 which are positioned contiguous one another to form a boundary 13 therebetween. Deflection of an incident light beam is achieved as the beam traverses boundary 13.

Acoustic vibration damping means 16 comprises an acoustic impedance matching means 20 and an acoustic vibration absorbing means 21. Acoustic impedance matching means 20 is positioned contiguous one of the plurality of faces of composite E-O crystal 13. Likewise, acoustic impedance damping means 17 comprises an acoustic impedance matching means 24 and an acoustic vibration absorbing means 25. Acoustic impedance matching means 24 is positioned contiguous a face of composite crystal 10 oppositely disposed from impedance matching means 20. Acoustic impedance matching means 20 and 24 have acoustic impedances which are substantially identical to the acoustic impedance of E-O crystals 11 and 12 respectively. For example, when E-O crystals 11 and 12 are composed of lithium niobate (LiNbO₃), one choice of material for acoustic impedance matching means 20 and 24 is also LiNbO₃. By choosing identical materials, the acoustic impedance is, of course, the same for both mediums. This being the case, there is no significant acoustic energy reflection at the interface between the two media. Acoustic absorbing means 21 and 25, is for example, a material known as coustibab (style No. CC–488c/AFA) manufactured by Carter Rice Storrs & Bement Incorporated.

Electrode means (not shown) for applying an electric field to E-O crystals 11 and 12 are separately deposited on each of the oppositely disposed faces of 11 and 12 parallel to the plane defined by the X and Y axes. The technique for applying an electric field to an E-O crystal is well-known in the art.

In operation, a light beam is incident composite crystal 10 along the Y axis. An electric field is applied to at least one of the E-O crystals 11 and 12 to obtain an amount of light beam deflection proportional to the magnitude of the applied field. For a complete description of light beam deflection using E-O crystals, see the article entitled "Light Beam Deflection with Electro-optic Prisms" by T. C. Lee and J. David Zook appearing in IEEE Journal of Quantum Electronics, Vol. QE–4, No. 7, July 1968.

As mentioned previously, the E-O effect is inherently accompanied by a piezoelectric effect. For the case where E-O crystals 11 and 12 are composed of LiNbO₃, the strains piezoelectrically induced within the crystal are given by $$S_1 = S_2 = d_{31}E_3$$
$$S_3 = d_{33}E_3$$

Where:

$S_1$ = Induced strain along the X axis;
$S_2$ = Induced strain along the Y axis;
$S_3$ = Induced strain along the C axis;
$E_3$ = Magnitude of the applied electric field;
$d_{31}$ = Piezoelectric coefficient along the X axis;
$d_{33}$ = Piezoelectric coefficient along the C axis;

The strains $S_1$ and $S_2$ excite longitudinal mode resonances along the X and Y axes, respectively. The magnitude of these stains, without an absorber means present, is dependent upon the acoustic Q of the E-O crystal. As illustrated, acoustic impedance matching means 20 and 24 are positioned contiguous E-O crystals 11 and 12, respectively, so as to absorb the acoustic vibrations generated along the X dimension. By choosing a material having substantially the same acoustic impedance as E-O crystals 11 and 12, the acoustic energy, illustrated as wavy line 22 in FIG. 1a, is entirely transmitted across the interface between the E-O crystal and the acoustic impedance matching means. The acoustic energy transmitted into acoustic impedance matching means 20 is internally reflected at face 23 toward acoustic vibration absorbing means 21. Upon incidence on absorbing means 21, the acoustic energy is substantially absorbed. However, a minor portion of the acoustic energy is reflected at the interface between the acoustic impedance matching means and the acoustic absorbing means. This reflected energy is again incident on face 23. In the embodiment illustrated, the angle $\alpha$ is chosen greater than 45° so that the reflected energy incident face 23 is not directed back into the composite crystal 10. Similarly, acoustic energy is also transmitted out of composite crystal 10 by dampening means 17.

The strain $S_3$ excites a thickness-mode extensional resonance along the C axis. The damping of this extensional resonance is discussed in conjunction with the embodiment illustrated in FIGS. 2 and 3.

The acoustic damping means does not, of course, have to be in the form illustrated in FIGS. 1 and 1a. Rather, any configuration can be utilized so long as it provides substantially entire transmission of the acoustic energy out of composite crystal 10 and attenuates or directs the acoustic energy transmitted out of crystal 10 such that the energy does not return to the crystal. Thus, it is not necessary that the acoustic damping means include separate absorber means 21 and 25. As explained in conjunction with the embodiment illustrated in FIGS. 2 and 3, sometimes a properly shaped acoustic impedance matching means is adequate to achieve damping of the acoustic energy.

Shown in FIG. 2 is a composite electro-optic crystal, generally designated 30, which is formed by a plurality of adjacent polyhedrons 31a, 31b and 31c. A cross-section along the line 3—3 is shown in FIG. 3. In the embodiment illustrated, polyhedrons 31a and 31c are in the form of substantially identical right triangular prisms and polyhedron 31b is in the form of a substantially isosceles triangular prism. E-O crystals 31a, 31b and 31c are positioned contiguous one another to form the composite E-O crystal generally designated 30. Composite crystal 30 is in the form of a rectangular parallelepiped. As illustrated, each of the crystals 31a, 31b and 31c is composed of LiNbO$_3$ and therefore each has an electric field dependent index of refraction. To maximize light beam deflection, E-O crystals 31a, 31b and 31c have electric fields along the C-axis in opposite directions as illustrated by arrows 40a, 40b and 40c.

Acoustic vibration damping means 34a and 34b and acoustic vibration damping means 36a and 36b are positioned contiguous oppositely disposed parallel faces of right triangular prisms 31a and 31c, respectively. Similarly, acoustic vibration damping means 35a and 35b are positioned contiguous oppositely disposed parallel faces of isosceles triangular prism 31b. As illustrated, the damping means 34a, 34b, 35a, 35b, 36a and 36b are pyramidal in shape. The pyramidal shape of the acoustic vibrations damping means causes multiple internal reflections of the acoustic energy within the damping means which results in the acoustic path being significantly lengthened thereby (1) lowering the acoustic resonance and (2) substantially reducing the magnitude of the resonance. Thus, the thickness-mode extensional resonances caused by the strain $S_3$ are suppressed by acoustic damping means 34a, 34b, 35a, 35b, 36a and 36b.

For the case in which crystals 31a, 31b and 31c are composed of LiNbO$_3$, the acoustic vibration damping means can be composed of copper. Since lithium niobate has an acoustic impedance along the C-axis of 3 ×10$^6$ g/cm$^2$-sec as compared to that of 4 × 10$^6$ g/cm$^2$-sec for copper, the impedances of the two materials are very well matched. An additional advantage provided by the utilization of copper damping means is that the damping means can be adapted to apply an electric field to the E-O crystals 31a, 31b and 31c along their respective C-axes. The polarity of the electric field applied to the E-O crystals is illustrated by the plus minus notations 40a, 40b and 40c in FIG. 3. The electrodes to 31a, 31b and 31c are arranged so as to be electrically isolated from one another on the crystal face.

FIG. 2 further illustrates acoustic vibration damping means for suppressing the acoustic resonances occurring along the X axis within composite parallelepiped 30. As illustrated, acoustic vibration damping means 38 and 39 take the form of thin planar sheets, and are positioned contiguous oppositely disposed faces of composite crystal 30. It has been found experimentally that the utilization of 3M acoustic dampening tape such as Y9162c or Y9273 is effective in reducing the induced acoustic vibrations. The particular shape and composition of damping means 38 and 39 is not critical so long as the acoustic energy propagating along the X axis is transmitted out of composite crystal 30 and dampened or directed such that it does not re-enter the crystal. However, when damping means 34a, 34b, 35a, 35b, 36a and 36b are composed of a conducting material to allow application of an electric field thereby, damping means 38 and 39 must be composed of non-conducting material to avoid short-circuiting the electric field.

Since the light beam enters and exits composite crystal 30 along the Y axis, the damping means (not shown) utilized to dampen the acoustic energy occurring along the Y axis must be transparent to the incident light beam. For example, the faces of the composite crystal 30 through which the light beam enters and exits can be cut at a Brewster angle for the incident and exiting light beam. Such a technique is further described in conjunction with the embodiment shown in FIG. 4.

Illustrated in FIG. 4 is a further embodiment of the present invention. A composite electro-optic crystal, generally designated 50, is comprised of a plurality of polyhedrons 51a, 51b, 51c and 51d which are in the form of substantially identical right triangular prisms. The triangular prisms are positioned contiguous one another so as to form a substantially square parallelepiped. In this embodiment the E-O crystals are composed of potassium dihydrogen phosphate (KDP) type crystals. Acoustic vibration dampening means, generally designated 52, is positioned contiguous the face of composite parallelepiped 50 formed by prism 51b. Dampening means 52 comprises acoustic impedance matching means 56 and acoustic vibration absorbing means 57a and 57b. Likewise, acoustic vibration dampening means, generally designated 53, is positioned contiguous the face of composite parallelepiped 50 formed by triangular prism 51c. Dampening means 53 comprises acoustic impedance matching means 58 and acoustic vibration absorbing means 59a and 59b.

Total internal reflection means 62 and 64 and mirrors 66 and 68 are positioned about parallelepiped 50 so as to direct an incident light beam, generally designated 70, through the composite parallelepiped a plurality of times. Deflection of light beam 70 occurs as the beam traverses the boundaries between the contiguous E-O crystals 51a, 51b, 51c and 51d and is proportional to the magnitude of the electric field applied along the C-axis of one or more of the crystals. To achieve additional deflection, an additional mirror can be positioned adjacent E-O crystal 51d to return the exiting light beam back into the composite prism.

The acoustic energy piezoelectrically induced along the X axis is illustratively shown in FIG. 4a as wavy lines 72 and 74. Since acoustic impedance matching means 58 is a material having an identical or nearly identical acoustic impedance as prism 51c, substantially all the acoustic energy incident the interface between prism 51c and impedance matching means 58 will enter 58. In the preferred embodiment illustrated, E-O crystals 51a, 51b, 51c and 15d are composed of potassium dideuterium phosphate (KD*P) and impedance matching means 56 and 58 are composed of glass. The acoustic energy transmitted out of composite parallelepiped 50 is then incident either face 60 or 61 of acoustic impedance matching means 58. By cutting the acoustic impedance matching material so that the angle $\theta_B$ is equal to the Brewster angle, a light beam incident face 60 or 61 is transmitted therethrough. The acoustic energy, on the other hand, is reflected by either face 60 or 61 toward acoustic vibration absorbing means 59a and 59b, respectively. Substantially all of the acoustic energy is then absorbed in the absorbing means 59a and 59b. Acoustic damping means 52 functions in an equivalent manner to acoustic dampening means 53. Thus, the acoustic energy piezoelectrically induced along the X and Y axes is substantially dampened thereby preventing the occurrence of acoustic resonances along these two axes within composite crystal 50. Utilizing KDP type E-O crystals, acoustic vibrations are not piezoelectrically induced along the C axis when the electric field is applied along the C axis. Thus, it is not necessary to provide damping means along this axis.

The present invention has been described in conjunction with a series of preferred embodiments. However, it will be obvious to one skilled in the art that modifications can be made to the embodiments described herein without departing from the spirit or scope of the present invention. For example, the composition of the acoustic impedance matching means can be any composition which has nearly the same acoustic impedance as the contiguous E-O crystal. Similarly, any geometrical configuration which does not provide an acoustic energy feedback path to the contiguous E-O crystal can be utilized.

The embodiments of the invention in which an exclusive property or right is claimed are defined as follows:

1. A light beam modulator comprising:
   an electro-optic crystal for receiving an incident light beam and for modulating the beam propagating therethrough in response to an applied electric field by the electro-optic effect, the crystal having piezoelectrically induced acoustic vibrations in at least one direction within the crystal and having a plurality of faces, a first face of the plurality for receiving and transmitting an incident light beam, and
   acoustic vibration damping means positioned contiguous at least second and third substantially oppositely disposed faces of the plurality of crystalline faces and having substantially the same acoustic impedance as the electro-optic crystal so that the acoustic vibrations incident the interface between the crystal and the damping means are substantially transmitted into the damping means and dampened therein, wherein the acoustic vibration damping means form electrodes for applying an electric field to the electro-optic crystal.

2. A light beam modulator comprising:
   an electro-optic crystal for receiving an incident light beam and for modulating the beam propagating therethrough in response to an applied electric field by the electro-optic effect, the crystal having piezoelectrically induced acoustic vibrations in at least one direction within the crystal, and wherein the electro-optic crystal is formed by a plurality of adjacent polyhedrons, at least one of said polyhedrons having an electric field dependent index of refraction, the plurality of polyhedrons comprising a first polyhedron in the form of a substantially isosceles triangular prism and second and third polyhedrons in the form of substantially identical right triangular prisms, the second and third polyhedrons each being positioned contiguous a face of the first polyhedron so that the composite electro-optic crystal is in the form of a rectangular parallelepiped having a plurality of faces, a first face of the plurality for receiving an incident light beam, and
   acoustic vibration damping means positioned contiguous two oppositely disposed faces of each of the plurality of polyhedrons, the acoustic vibration damping means being composed of an electrical conductive material of substantially the same acoustic impedance as the adjacent electro-optic crystal so that the acoustic vibrations incident the interface between the crystal and the damping means are substantially transmitted into the damping means and dampened therein, the two oppositely disposed faces of each of the plurality of polyhedrons forming first and second oppositely disposed faces of the composite rectangular parallelepiped.

3. The light beam modulator of claim 2 wherein the acoustic vibration damping means includes further acoustic vibration damping means disposed contiguous third and fourth oppositely disposed parallel faces of the composite rectangular parallelepiped.

4. A light beam modulator comprising:
   an electro-optic crystal for receiving an incident light beam and for modulating the beam propagating therethrough in response to an applied electric field by the electro-optic effect, the crystal having piezoelectrically induced acoustic vibrations in at least one direction within the crystal, the electro-optic crystal being formed by a plurality of adjacent polyhedrons, at least one of said polyhedrons having an electric field dependent index of refraction,
   acoustic impedance matching means positioned contiguous at least one face of each of the plurality of polyhedrons for transmitting the acoustic vibrations out of the contiguous electro-optic crystal into the acoustic impedance matching means, wherein the acoustic impedance matching means has at least one face thereof cut at the Brewster angle with respect to the incident light beam so as to allow the light beam to propagate therethrough and to direct the acoustic vibrations incident thereon toward acoustic vibration absorbing means, and
   acoustic vibration absorbing means positioned contiguous the acoustic vibration damping means for absorbing the acoustic vibrations transmitted into the acoustic impedance matching means.

* * * * *

UNITED STATES PATENT OFFICE
CERTIFICATE OF CORRECTION

Patent No. 3,663,091          Dated May 16, 1972

Inventor(s) Tzuo-Chang Lee

It is certified that error appears in the above-identified patent and that said Letters Patent are hereby corrected as shown below:

On the cover sheet [72] the inventor's name should read -- Tzuo-Chang Lee --.

Signed and sealed this 7th day of November 1972.

(SEAL)
Attest:

EDWARD M.FLETCHER,JR.                ROBERT GOTTSCHALK
Attesting Officer                    Commissioner of Patents